E. F. NORELIUS.
TRUCK FOR VEHICLES.
APPLICATION FILED MAY 27, 1920. RENEWED MAY 31, 1921.
1,419,510.
Patented June 13, 1922.
3 SHEETS—SHEET 1.
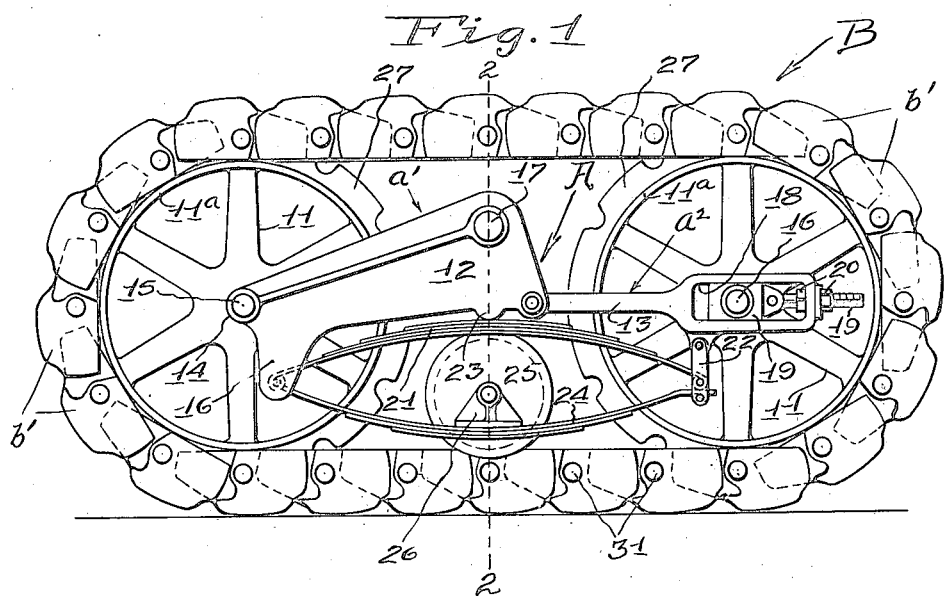
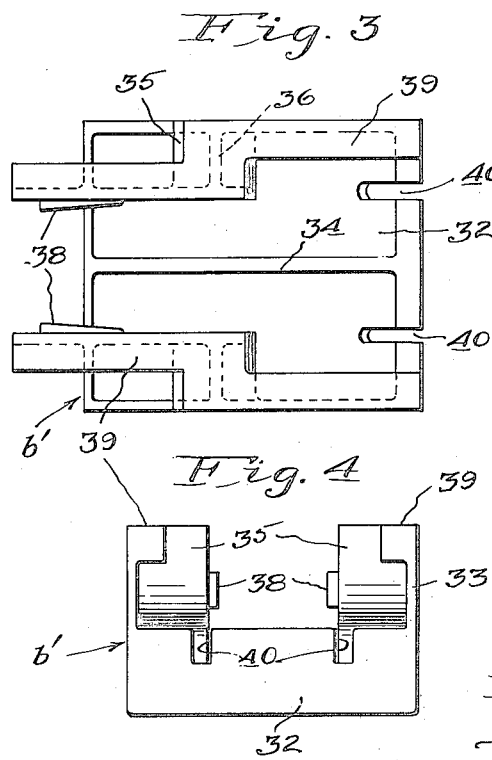
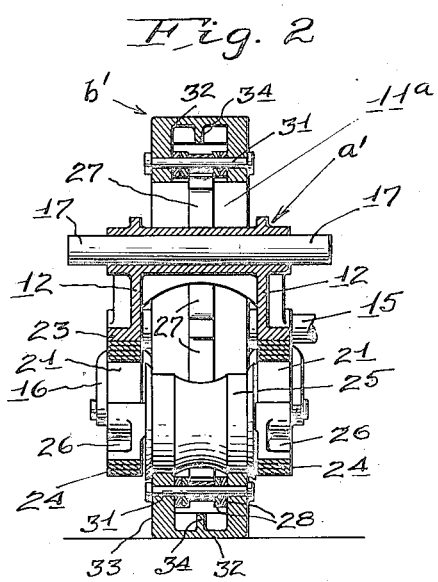
Inventor
Emil Francis Norelius
By Bradbury & Caswell
Attorneys

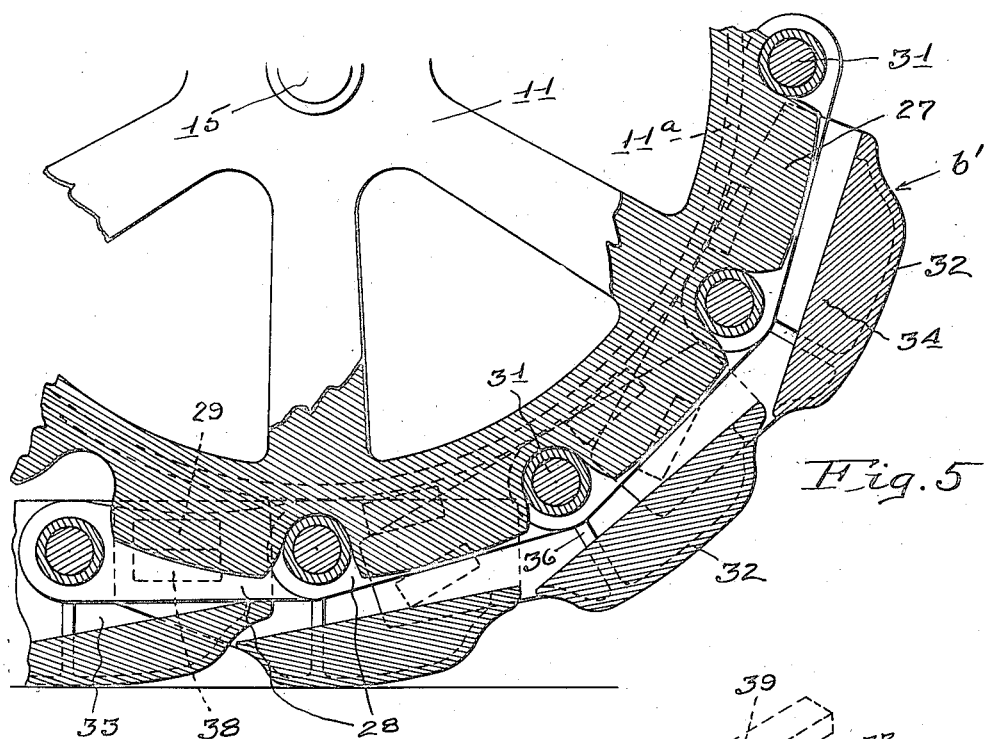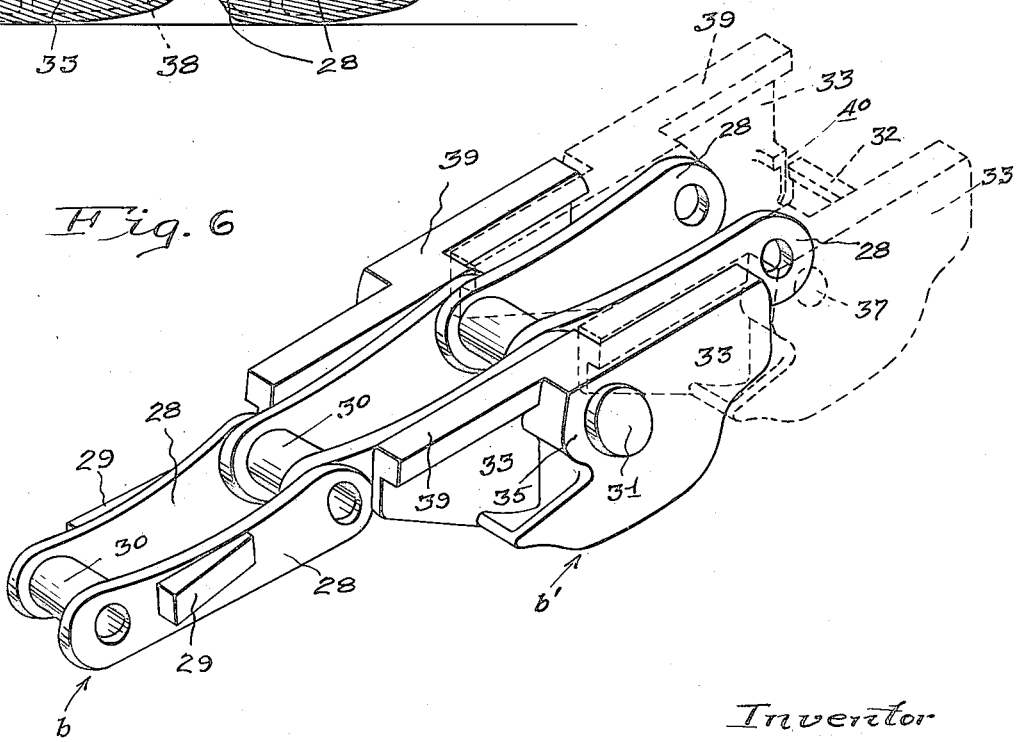

E. F. NORELIUS.
TRUCK FOR VEHICLES.
APPLICATION FILED MAY 27, 1920. RENEWED MAY 31, 1921.

1,419,510.

Patented June 13, 1922.
3 SHEETS—SHEET 3.

Inventor
Emil Francis Norelius
By Bradbury + Caswell
Attorneys

UNITED STATES PATENT OFFICE.

EMIL FRANCIS NORELIUS, OF MINNEAPOLIS, MINNESOTA.

TRUCK FOR VEHICLES.

1,419,510.  Specification of Letters Patent.  Patented June 13, 1922.

Application filed May 27, 1920, Serial No. 384,528. Renewed May 31, 1921. Serial No. 473,868.

*To all whom it may concern:*

Be it known that I, EMIL FRANCIS NORELIUS, a citizen of the United States, residing at Minneapolis, in the county of Hennepin and State of Minnesota, have invented a new and useful Truck for Vehicles, of which the following is a specification.

My invention relates to improvements in trucks for vehicles.

In the present trucks embodying weight supporting wheels carrying endless treads thereon, said wheels are elevated and lowered to a greater or less degree by the tread sections as they pass therebeneath. This rising and falling of said wheels results in damaging vibration and strains in the trucks and mechanism thereon and, further, results in the loss of power in propelling the trucks.

One object of my present invention is to provide a truck of this nature having an endless tread so designed as to avoid disturbing the normal vertical position of the supporting wheels, with respect to the ground surface, and thereby eliminate the above mentioned faults.

Another object is to provide a truck of this nature, which is simple in construction, light and durable.

A further object is to provide a truck of this kind, wherein the load is yieldingly carried and the weight thereof distributed over the supporting reach of the tread.

With the foregoing and other objects in view, which will appear in the following description, the invention resides in the novel combination and arrangement of parts and in the details of construction hereinafter described and claimed.

Figure 7:
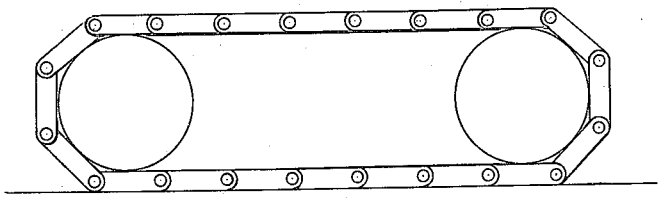
Figure 8:
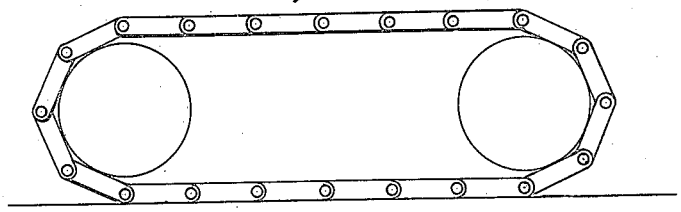
Figure 9:
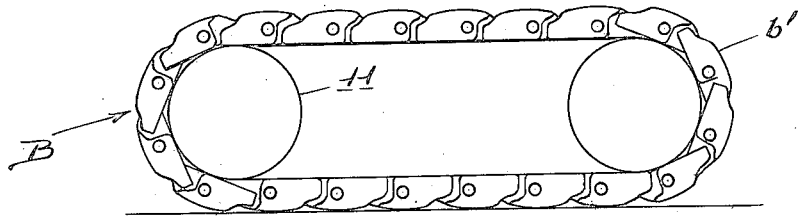
Figure 10:
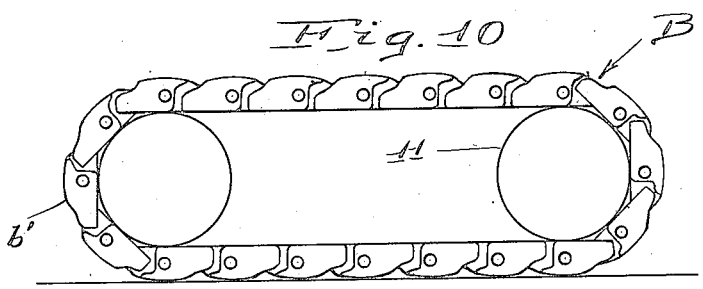

In the drawings, Fig. 1 is a view in elevation of one embodiment of my improved truck; Fig. 2 is a transverse sectional view taken on the line 2—2 of Fig. 1; Fig. 3 is a plan view in detail of one of the shoes employed in the endless tread; Fig. 4 is an end elevation thereof; Fig. 5 is a fragmentary view in detail illustrating, in section, a portion of my improved tread and one of the supporting wheels in connection therewith; Fig. 6 is a perspective view in detail illustrating two shoes together with links of the chain for joining said shoes; Figs. 7 and 8 are diagrammatic views of the ordinary truck, showing the treads thereof in different relations with respect to the supporting wheels and illustrating the vertical movements imparted to said wheels as the tread sections pass therebeneath and Figs. 9 and 10 are diagrammatic views of my improved truck, said views being similar to those in Figs. 7 and 8 and illustrating the constant vertical relation of my supporting wheels with the ground surface during the different positions of the tread sections.

Referring to the drawings, it will be seen that my improved truck includes a frame A, supporting wheels 11 and an endless tread B passing over said wheels.

The frame A includes two members $a^1$ and $a^2$, the former consisting of a pair of plates 12 and the latter, a pair of beams 13. The plates 12 have aligned journals 14 for the axle 15 of one of the supporting wheels 11 and are supplied with hangers 16 for purposes as will hereinafter appear.

Trunnions 17 in the frame member $a^1$ are designed to receive the weight of a vehicle frame or other load. The beams 13 are pivotally attached at their inner ends to the inner ends of the plates 12 and are formed with ways 18 near the outer ends thereof. Boxes 19, forming journals for the axle 16 of one of the supporting wheels 11, are slidably in said ways and are adjustably secured therein by bolts 19, each having nuts 20 thereon arranged to engage the ends of their respective beams. Adjustment of these nuts provides for shifting one of the supporting wheels with respect to the other thereby slackening or tightening the tread B as may be desired. The points of attachment between the plates 12 and beams 13 lie in a plane passing through the axes of the supporting wheels 11 and are located substantially beneath the trunnions 17 and midway between said wheels. On each side of the truck, a half elliptic spring 21 is carried at one end in a hanger 16, above mentioned, and at its other end in a shackle 22 depending from one of the beams 13. The plates 12 are formed with depending bearings 23 beneath the trunnions, said bearings resting upon said springs 21, as shown in Figs. 1 and 2. These springs yieldingly support the load placed upon the trunnions 17 and divide the weight thereof between the supporting wheels 11. I provide means for relieving the wheels 11 of a portion of the load and applying the same to the supporting reach of the tread at a position between said wheels. Said means includes two half elliptic springs 24, one on each side of the truck. Each spring is mounted at one end in one of the hangers 16 and is slidably held at its other end in one of the shackles 22. A truck wheel 25, journaled in brackets 26 on said springs 24, bears upon the lower reach of the tread B. These springs 24 cause the truck wheel 25 to follow the tread and are of sufficient strength to relieve the supporting wheels 11 of considerable weight.

The tread B consists of an endless chain $b$ and shoes $b^1$ carried upon said chain. Teeth 27 on the peripheries of the supporting wheels 11 mesh with the chain and secure the tread against lateral displacement. Said teeth also serve to propel the tread in case either or both of the wheels 11 are power driven. The links of the chain $b$ include side bars 28 with lugs 29 thereon and blocks 30 between said side bars. Pins 31 join said links and extend beyond the side bars thereof. Each pin 31 provides a pivotal and sole mounting for one of the shoes $b^1$, which will now be described. Said shoes are identical, each comprising a base 32 and side walls 33. The base is turned upward at either end and is reinforced by an inner longitudinal web 34. Medial bosses 35 near the upper edges of the side walls are reinforced by webs 36 and have aligned openings 37 therein to receive the extremities of a pin 31. The walls at one end of the shoe are offset inwardly with respect to the walls at the other end thereof, so that the narrow end of one shoe may rest within the wide end of the adjacent shoe. Rails 39 on the edges of the side walls overlap and form continuous rail surfaces for the supporting wheels 11 and truck wheel 25, said surfaces, during contact with said wheels being parallel with and equi-distant from the ground surface.

The chain $b$, housed within the shoes $b^1$, serves to join said shoes, the base of each shoe being formed at one end with slots 40 to receive the walls of the adjacent shoe. Weight is carried, not by the chain, but by the shoes, whose rails 39 form tracks for the truck wheel 25 and the rims 11$^a$ of the supporting wheels 11. Lugs 38 on the inner sides of the walls 33, at the narrow end of each shoe, are designed to abut beneath lugs 29 on the side bars 28 of a chain link. The upturned portion of the base of each shoe, at the wide end thereof, abuts beneath the side bars 28 of a chain link. The co-action of the shoes $b^1$ with the chain $b$, through the lugs 38 and 29 at one end of each shoe and through the base and a chain link at the other end of each shoe, causes the shoes to be braced by the chain, against tipping movements, under weight of the wheels 11, or otherwise, and results in bridging the spaces between said wheels.

In the ordinary truck (Figs. 7 and 8), the links of the chain cause repeated vertical movements of the supporting wheels, as they leave the ground level or return thereto, thus racking the truck and mechanism carried thereby. In my improved truck, the supporting wheels are not raised or dropped, as the links are lifted from the ground surface or lowered thereto. The overlapping shoes, pivoted medially on the pins 31 in the chain $b$, furnish the track for the supporting wheels. When my improved tread passes from the turn on a supporting wheel 11 beneath said wheel, the weight supporting shoe, with its rails 39 in parallelism with the ground surface, carries the wheel until the next shoe drops from the turn and is similarly seated, whereupon the supporting wheel rolls upon the rails of the last seated shoe. When the tread passes from beneath a supporting wheel to the turn on said wheel, the weight carrying shoe remains seated with its tracks in parallelism with the ground surface until the supporting wheel rolls upon the rails of the following shoe, the increasing inclination of the leading links to said first mentioned shoe having no effect upon said shoe and leaving the same undisturbed in seated position until the second mentioned shoe receives the weight of the supporting wheel. As before stated, the chain links do not support the wheels 11. They connect the shoes $b'$, said shoes being supplied with the rails 39, upon which the rims 11$^a$ of the supporting wheels 11 roll. Each shoe is seated with its rails in parallelism with the ground surface prior to the passing of a wheel 11 thereon. In reversed movements of the tread upon the supporting wheels, the leading or trailing links 28 of a shoe supporting a wheel 11 are either increased or decreased in inclination. These angular movements of said links do not disturb the position of a shoe until after the wheel has passed from said shoe to the following shoe. In other structures of this type, the wheel supporting links in the tread are raised or lowered more or less during the times wherein they are functioning as wheel supporting elements.

My truck may be employed singly, in pairs or otherwise and may serve as a support for a draft vehicle or as a driving traction element therefor. In the latter case power may be suitably transmitted to either or both of the supporting wheels 11.

Changes in the specific form of my invention, as herein disclosed, may be made within the scope of what is claimed without departing from the spirit of my invention.

Having described my invention, what I claim as new and desire to protect by Letters Patent is:

1. In a device of the class described, a pair of wheels, an endless tread passing over said wheels and comprising a chain and overlapping shoes pivoted transversely and medially on the pins in said chain, said shoes being formed with tracks thereon to support the wheels and said chain and shoes being supplied with coacting stops to prevent the tread from breaking inwardly in the upper and lower reaches thereof.

2. In a device of the class described, a pair of wheels, an endless tread, passing over said wheels, including a series of links, pins pivotally joining said links in an endless chain and shoes, one pivoted on each pin, each shoe having a wheel supporting track offset at either side of its pivot, each offset portion of said track being lapped by an offset portion of the adjacent shoe, said shoes being designed to co-act with the links of the chain, whereby the shoes are braced against tipping movements.

3. In a device of the class described, a pair of supporting wheels having teeth on the rims thereof, a frame for said wheels, a tread passing over the wheels and including an endless chain in mesh with said teeth, said chain comprising links and pins joining said links and projecting from either side thereof, a plurality of shoes, each comprising a base and side walls formed with bores to receive the ends of a pin in said chain, rails on said walls designed to lap the rails of adjacent shoes, said rails forming a track for the supporting wheels.

4. In a device of the class described, a pair of supporting wheels having teeth on the rims thereof, a frame for said wheels, a tread passing over the wheels and including an endless chain in mesh with said teeth, said chain comprising links with lugs thereon and pins joining said links and projecting from either side thereof, a plurality of shoes, each comprising a base and side walls with bosses midway thereof formed with bores to receive the ends of a pin in said chain, said side walls at one end of the shoe being offset inwardly with respect to the walls at the opposite end of the shoe, rails on said walls adapted to lap the rails of adjacent shoes and lugs on the side walls arranged to engage the lugs on said links, said rails being adapted to form a track for the supporting wheels and said lugs being designed to coact and prevent the tread from breaking inwardly in the upper and lower reaches thereof.

5. In a device of the class described, a pair of wheels, an endless tread passing over said wheels and comprising a plurality of lapping shoes and a chain joining said shoes, the connecting elements between the chain sections providing pivotal mountings for the shoes, said shoes forming lapping tracks for the wheels and designed to co-operate with the chain sections to prevent the shoes from tilting under the weight of the wheels.

6. In a truck a pair of supporting wheels, a tread, passing over said wheels, including a chain and shoes pivotally carried at the joints between the chain links, said shoes having lapping tracks for said wheels and adapted to co-act with the chain links to prevent the tipping of the shoes by the weight of the wheels thereon.

7. In a truck a pair of supporting wheels, a tread passing over said wheels, including a chain and shoes pivotally carried at the joints between the links of said chain, each shoe having a wheel supporting track reaching in opposite directions on either side of its pivot substantially to the pivots of the next adjacent shoes and a stop near each end of each shoe, arranged to co-act with the chain to prevent the tipping of the shoes under the weight of the supporting wheels.

In testimony whereof, I have signed my name to this specification.

EMIL FRANCIS NORELIUS.